US007069661B2

(12) United States Patent
Liao

(10) Patent No.: US 7,069,661 B2
(45) Date of Patent: Jul. 4, 2006

(54) LASER LEVELING DEVICE HAVING SELECTABLE LIGHT BEAM

(76) Inventor: Wen Hsin Liao, P.O.Box 63-298, Taichung, 406 (TW)

(*) Notice: Subject to any disclaimer, the term of this patent is extended or adjusted under 35 U.S.C. 154(b) by 0 days.

(21) Appl. No.: 10/949,789

(22) Filed: Sep. 27, 2004

(65) Prior Publication Data

US 2005/0044736 A1 Mar. 3, 2005

Related U.S. Application Data

(63) Continuation-in-part of application No. 10/652,462, filed on Aug. 29, 2003, now abandoned.

(51) Int. Cl.
*G01C 15/00* (2006.01)

(52) U.S. Cl. .................... 33/286; 33/DIG. 21; 362/280

(58) Field of Classification Search ................. 33/286, 33/DIG. 21, 227, 281, 282, 283, 285, 451; 362/187, 280, 259, 253, 277, 282, 319, 322, 362/323; 356/139.03–139.08

See application file for complete search history.

(56) References Cited

U.S. PATENT DOCUMENTS 5,075,977 A * 12/1991 Rando ......................... 33/227
5,450,148 A * 9/1995 Shu et al. ..................... 353/42
5,838,431 A * 11/1998 Hara et al. .................. 356/138
5,842,282 A * 12/1998 Ting ........................... 33/227
6,005,719 A * 12/1999 Rando ........................ 359/629
6,009,630 A * 1/2000 Rando ......................... 33/365
6,062,702 A * 5/2000 Krietzman .................. 362/158
6,102,553 A * 8/2000 Ting .......................... 362/259
6,360,446 B1 3/2002 Bijawat et al. ............... 33/451
6,493,955 B1 12/2002 Moretti ........................ 33/451
6,735,879 B1 5/2004 Malard et al. ................ 33/286
6,763,598 B1 * 7/2004 Chen .......................... 33/286
6,826,841 B1 * 12/2004 Liao ........................... 33/286
6,941,665 B1 * 9/2005 Budrow et al. ............... 33/286
2005/0155237 A1 * 7/2005 Lee ............................ 33/286

* cited by examiner

*Primary Examiner*—Diego Gutierrez
*Assistant Examiner*—Amy R. Cohen
(74) *Attorney, Agent, or Firm*—Charles E. Baxley

(57) ABSTRACT

A laser leveling device includes a laser instrument disposed in a housing, a plate slidably received in the housing and a lens attached to the plate. The lens includes two or more portions having different patterns to generate different light beams when the laser instrument generates the light through either of the portions of the lens, by moving the plate relative to the housing. The plate includes an aperture movable to align with the laser instrument, to allow the light beam to selectively emit through the aperture of the plate directly, without emitting through the lens. A switch may be disposed in the housing and actuated by the plate when either the aperture or the lens of the plate is aligned with the laser instrument.

7 Claims, 5 Drawing Sheets

LASER LEVELING DEVICE HAVING SELECTABLE LIGHT BEAM

The present invention is a continuation-in-part of U.S. patent application Ser. No. 10/652,462, filed on 29 Aug. 2003, now abandoned.

BACKGROUND OF THE INVENTION

1. Field of the Invention

The present invention relates to a laser leveling device, and more particularly to a laser leveling device having selectable light beams.

2. Description of the Prior Art

Various kinds of typical laser leveling devices have been developed and comprise a laser instrument for generating a light beam.

For example, U.S. Pat. No. 6,360,446 to Bijawat et al. discloses one of the typical laser leveling devices comprising a housing, a laser instrument disposed in the housing for generating a light beam, a plate slidably received in the housing, and a lens attached to the plate, in which the plate is movable relative to the housing to selectively align the lens with the laser instrument, to allow the light beam generated by the laser instrument to selectively emit through the lens.

However, the lens of Bijawat et al. may only be used to generate straight lines, but may not be used to generate cross lines or horizontal and vertical lines.

U.S. Pat. No. 6,493,955 to Moretti discloses another typical laser leveling device which comprises a laser instrument for generating light beams through a lens to generate light beams, and a plate including an actuator extending from the plate to selectively engage with the switch and to selectively actuate the laser instrument when the lens is aligned with the laser instrument. However, similarly, the lens of Moretti may only be used to generate straight lines, but may not be used to generate cross lines or horizontal and vertical lines.

U.S. Pat. No. 6,735,879 to Malard et al. discloses a further typical laser leveling device which also comprises a housing, a laser instrument disposed in the housing for generating a light beam, a plate slidably received in the housing, a lens solidly disposed in front of a laser diode, and a door acting as a switch for the power supply of the laser line generating device and movable relative to the housing to selectively align the lens with the laser instrument.

However, the lens is solidly disposed in front of the laser diode, and may not be moved to be selectively aligned with the laser diode, such that the light beam generated by the laser diode may only be selectively emitted through the lens, or be blocked by the door.

In addition, similarly, the lens of Malard et al. also may only be used to generate straight lines, but may not be used to generate cross lines or horizontal and vertical lines.

The present invention has arisen to mitigate and/or obviate the afore-described disadvantages of the conventional laser leveling devices.

SUMMARY OF THE INVENTION

The primary objective of the present invention is to provide a laser leveling device having a slidable plate to selectively change to different light beams.

In accordance with one aspect of the invention, there is provided a laser leveling device comprising a housing, a laser instrument disposed in the housing for generating light, a plate slidably received in the housing and movable relative to the housing, and a lens attached to the plate, the lens includes a first portion having a first pattern provided therein to generate a first light beam when the laser instrument generates the light through the first portion of the lens, and includes a second portion having a second pattern provided therein to generate a second light beam when the laser instrument generates the light through the second portion of the lens. The plate is movable relative to the housing to selectively align either of the first portion or the second portion of the lens with the laser instrument, to allow the light beam generated by the laser instrument to selectively emit through either of the first portion or the second portion of the lens.

The first pattern includes at least one vertical line formed in the first portion of the lens. The second pattern includes at least one horizontal line formed in the second portion of the lens. The lens includes an intermediate portion located between the first portion and the second portion of the lens. A third light beam is generated through the intermediate portion of the lens when the intermediate portion of the lens is moved to be aligned with the laser instrument.

The housing includes a switch disposed therein, the plate includes an actuator extended therefrom to selectively engage with the switch, and to selectively actuate the laser instrument when the lens of the plate is aligned with the laser instrument. The switch includes a knob provided thereon for being actuated by the actuator of the plate.

The plate includes an aperture formed therein, and movable to be selectively aligned with the laser instrument when the plate is moved relative to the housing, to allow the light generated by the laser instrument to selectively emit through the aperture of the plate directly.

The actuator of the plate may be selectively engaged with the switch, and to selectively actuate the laser instrument when the aperture of the plate is aligned with the laser instrument. The plate includes a hand grip provided thereon for moving the plate relative to the housing. An energizing device may further be provided for energizing the laser instrument.

The housing includes a magnetic member disposed therein for attracting and securing the housing onto a supporting member. The housing includes a rotary member having a nail extended therefrom and selectively extendible out of the housing for engaging into a supporting member. The housing includes at least one bubble leveling vial attached thereon.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
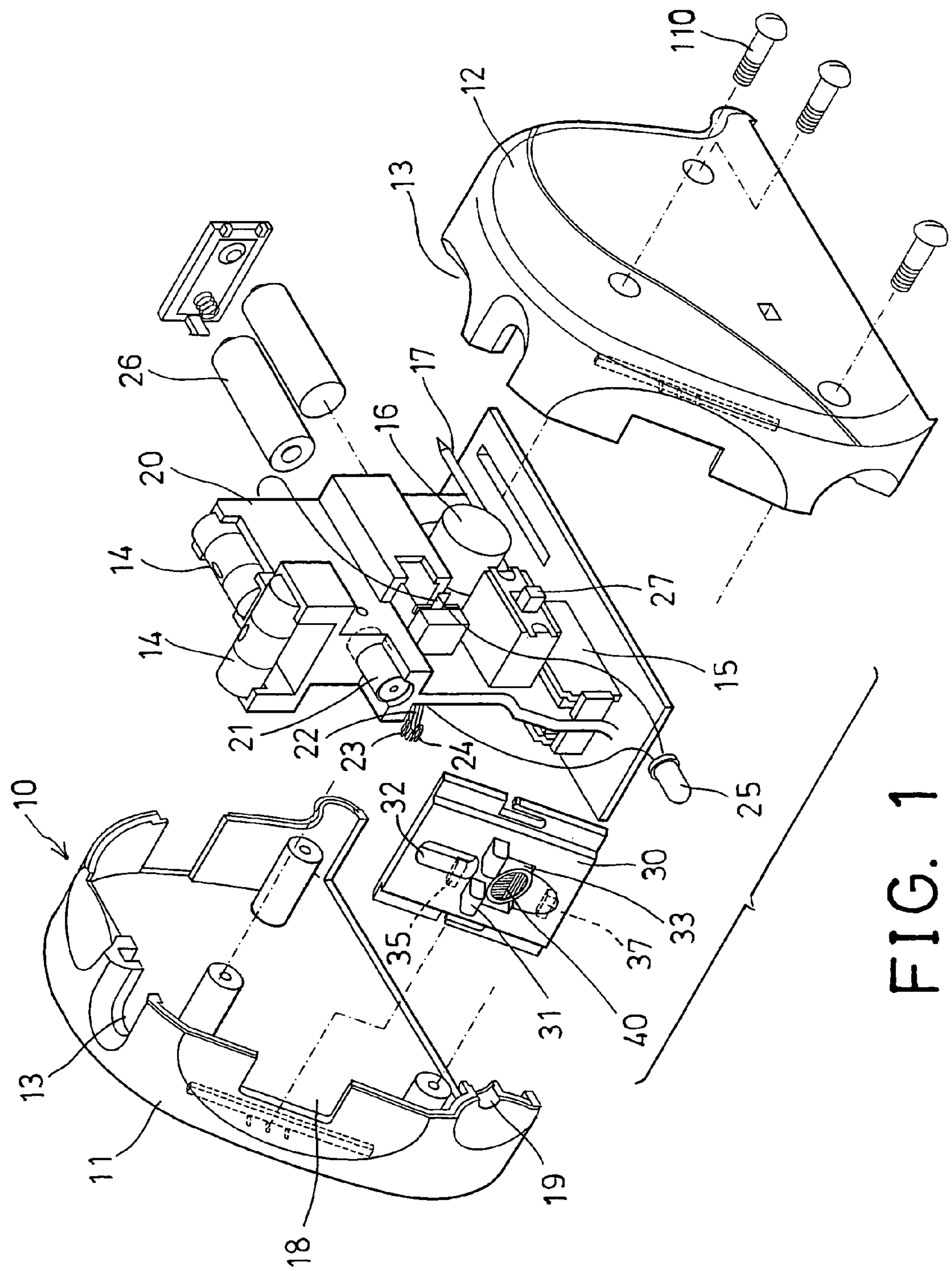
FIG. 1 is an exploded view of a laser leveling device in accordance with the present invention.

Referring to the drawings, and initially to FIGS. 1–4, a laser leveling device in accordance with the present invention comprises a housing 10 including two housing members 11, 12 secured together with fasteners 110, adhesive materials, or by welding processes. The housing 10 includes one or more depressions 13 formed therein to receive bubble leveling vials 14 therein respectively.

Figure 4:
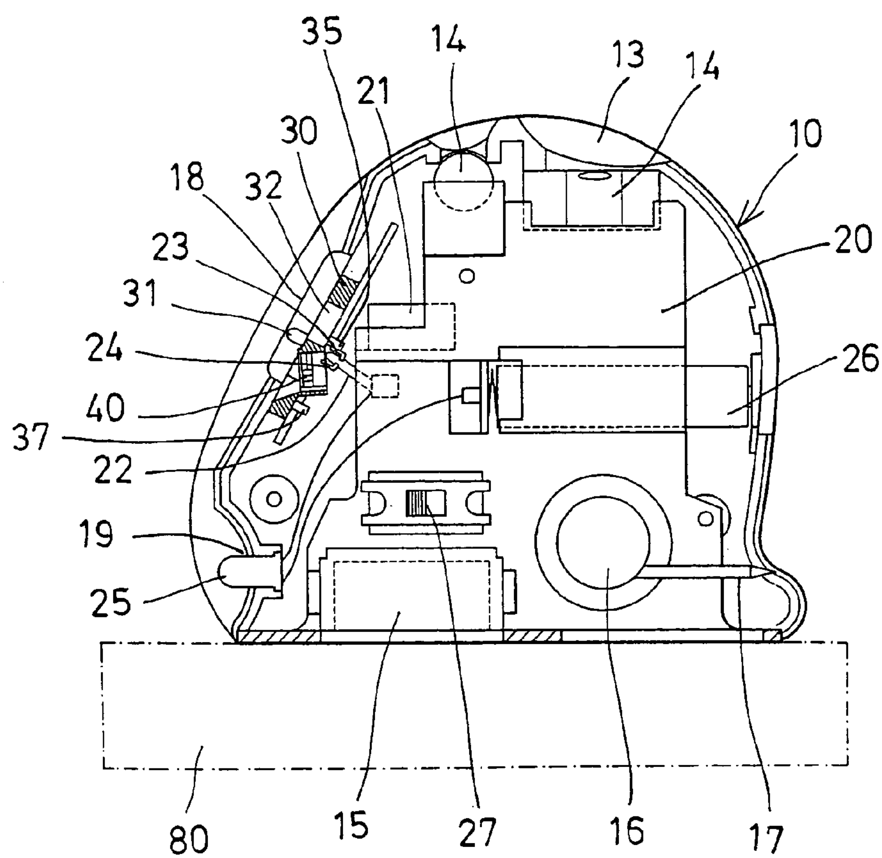
FIG. 4 is a cross sectional view of the laser leveling device, taken along lines 4—4 of FIG. 2.

The housing 10 includes a magnetic member 15, such as an electromagnetic member 15 disposed in the bottom portion thereof for stably attracting and securing the housing 10 onto a metal or an electromagnetic supporting member 80 (FIG. 4). The housing 10 further includes a rotary member 16 rotatably received in the bottom portion thereof, and includes a nail 17 attached thereto and rotatable outwardly through a groove 101 of the housing 10 (FIGS. 7–9), for engaging into a wood or other supporting member 90.

The housing 10 includes an opening 18 formed in the front and middle portion thereof, and includes an orifice 19 formed in the front and lower portion thereof. A circuit board 20 is received and secured in the housing 10, and includes a laser instrument 21 attached thereto or received and secured in the housing 10. The laser instrument 21 is aligned with or directed toward the opening 18 of the housing 10, for generating and emitting various light beams 70, 71 out through the opening 18 of the housing 10 (FIGS. 6–9).

A switch 22 is attached to the circuit board 20 and/or received and secured in the housing 10, and includes two triggers or knobs 23, 24 to be depressed or actuated to control the switch 22. An indicating light member 25 is engaged in the orifice 19 of the housing 10, and coupled to the circuit board 20, and one or more batteries 26 are attached to the circuit board 20 or to the housing 10, and are electrically coupled to energize the laser instrument 21 and/or the indicating light member 25, and/or the other electric elements, such as the electromagnetic member 15.

Another switch 27 may further be provided and attached to the circuit board 20 and/or secured to the housing 10, and coupled to the circuit board 20 and/or to the laser instrument 21 and/or the indicating light member 25, and/or the other electric elements, such as the electromagnetic member 15, in order to control the operation of the electric elements 15, 21, 25.

A plate 30 is slidably received in the housing 10, and arranged behind the opening 18 of the housing 10, and includes a hand grip 31 provided thereon or extended therefrom for moving the plate 30 relative to the housing 10, or for moving the plate 30 along the opening 18 of the housing 10. The plate 30 includes an aperture 32 formed therein and to be selectively aligned with the laser instrument 21 (FIG. 4), for allowing the light beam, such as dot-shaped light beam (not shown) generated by the laser instrument 21 to emit through the aperture 32 of the plate 30, and thus through the opening 18 of the housing 10.

Figure 7:
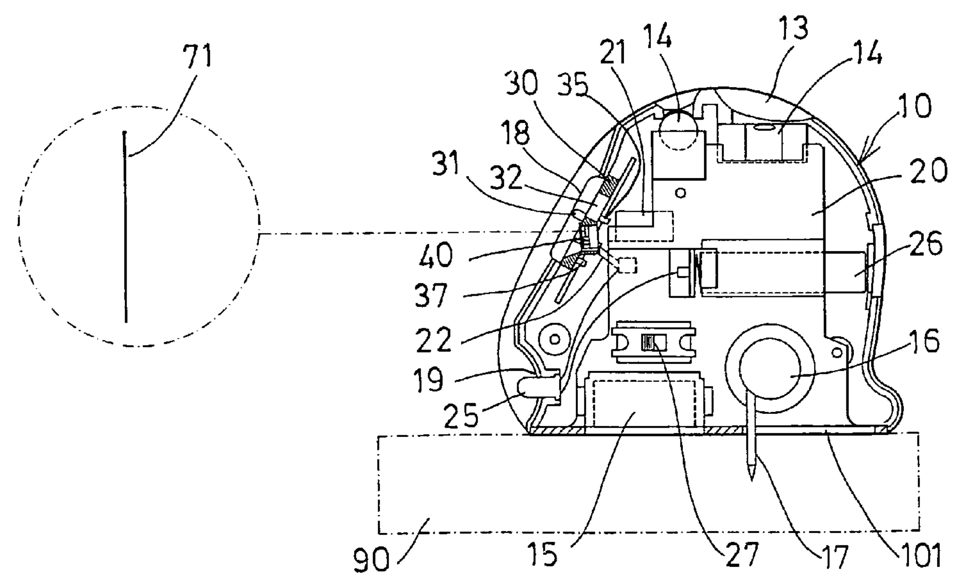
FIGS. 7, 8, 9 are cross sectional views of the laser leveling device, similar to FIG. 4, illustrating the operation of the laser leveling device.
Figure 8:
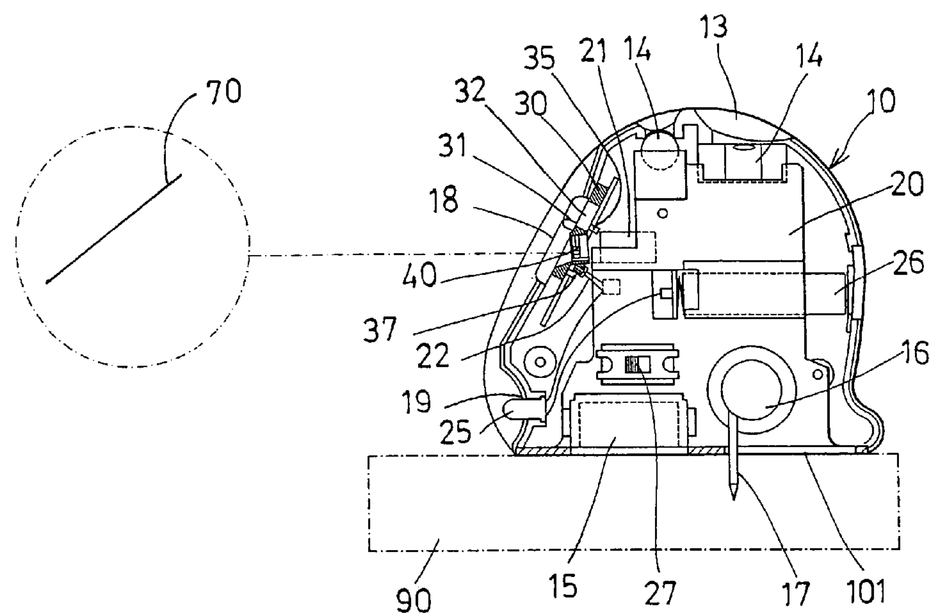
Figure 9:
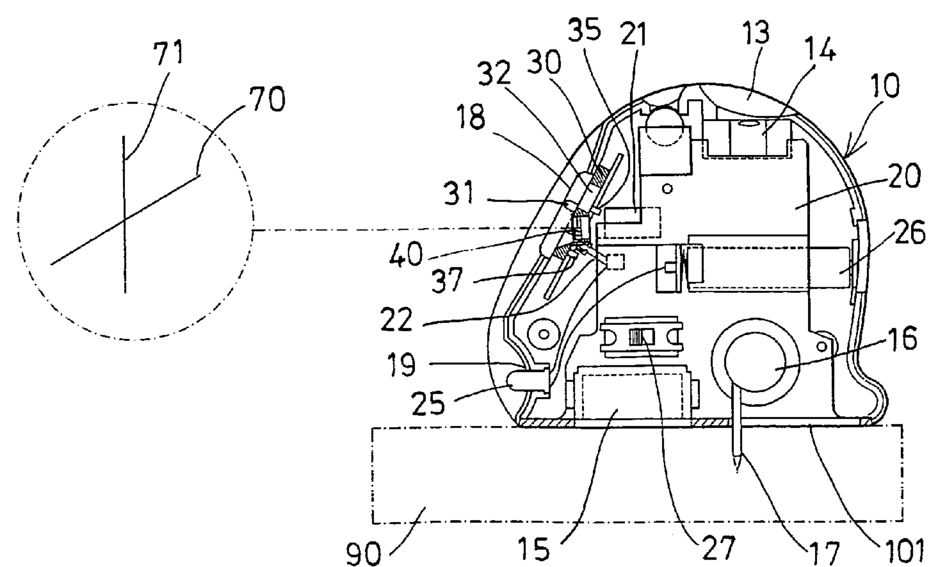

The plate 30 further includes a recess 33 formed therein (FIGS. 1–3), and a lens 40 received or engaged in the recess 33 of the plate 30, and to be selectively aligned with the laser instrument 21, for allowing the light beams 70, 71 to be generated by the laser instrument 21 through the lens 40 (FIGS. 7–9). The aperture 32 of the plate 30 and the lens 40 may be selectively moved to align with the laser instrument 21 when the plate 30 is moved relative to the housing 10 with the hand grip 31, for example.

The plate 30 includes a first actuator 35 extended therefrom, for engaging with or for depressing the knob 23 of the switch 22, in order to control or to actuate or to energize the laser instrument 21, when the aperture 32 of the plate 30 is moved to align with the laser instrument 21 (FIG. 4), and thus for allowing the light beam 70 generated by the laser instrument 21 to emit through the aperture 32 of the plate 30, and thus through the opening 18 of the housing 10.

The plate 30 further includes a second actuator 37 extended therefrom, for engaging with or for depressing the other knob 24 of the switch 22, in order to control or to actuate or to energize the laser instrument 21, when the recess 33 of the plate 30 and the lens 40 are moved to align with the laser instrument 21, and thus for allowing the light beams 70, 71 generated by the laser instrument 21 to emit through the lens 40, and thus through the opening 18 of the housing 10 (FIGS. 7–9).

When neither the aperture 32 of the plate 30 nor the recess 33 of the plate 30 and the lens 40 are aligned with the laser instrument 21, neither of the knobs 23, 24 of the switch 22 will not be actuated or depressed by the actuators 35, 37, such that the switch 22 will not be actuated, and such that the laser instrument 21 will not be energized to generate the light beams 70, 71.

As shown in FIG. 4, when the aperture 32 of the plate 30 is moved to align with the laser instrument 21, the light beam generated by the laser instrument 21 is not blocked by the plate 30 and may be emitted through the aperture 32 of the plate 30 and the opening 18 of the housing 10, such that the shape of the light beam will not be changed, and the light beam may include various shape, such as a point or dot shape light beam, one example of the light beam has been disclosed in the co-pending U.S. patent application Ser. No. 10/652,462, filed on 29 Aug. 2003, which may be taken as a reference for the present invention.

Figure 5:
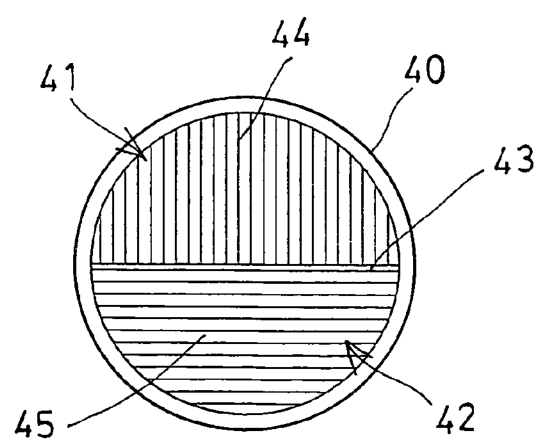
FIG. 5 is a front plan view of a lens of the laser leveling device.
Figure 6:
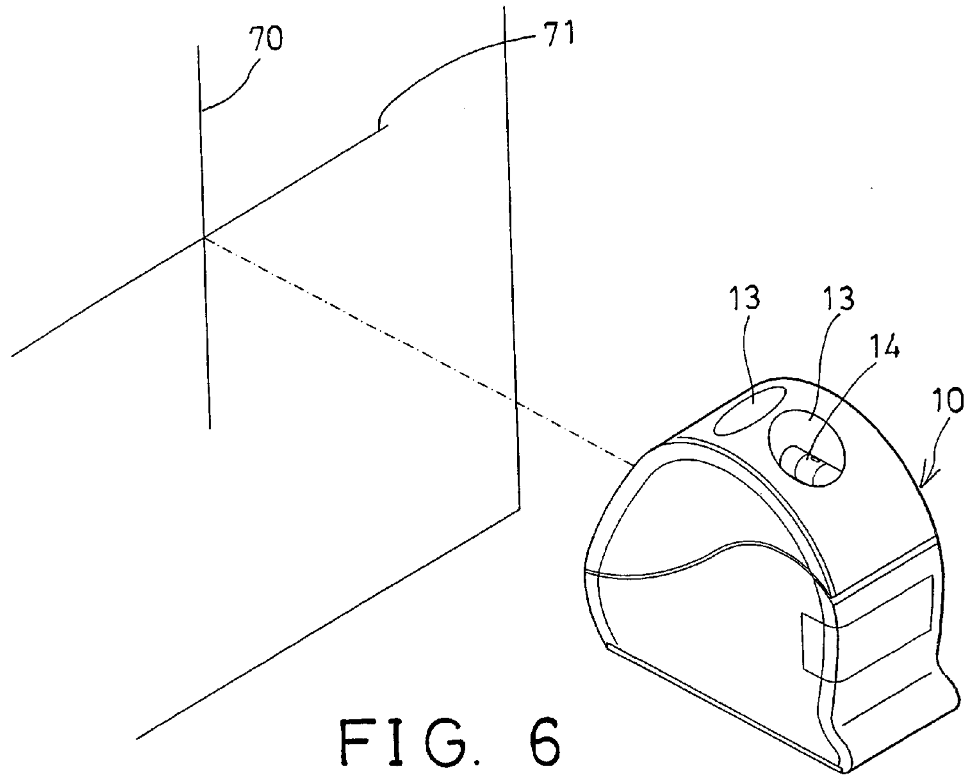
FIG. 6 is a rear perspective view illustrating the operation of the laser leveling device.

As shown in FIG. 5, the lens 40 includes two or more portions 41, 42 formed therein, such as an upper portion 41, a lower portion 42 and an intermediate portion 43 located between the upper portion 41 and the lower portion 42. For example, the lens 40 includes a first pattern 44, such as one or more vertical lines 44 formed in the upper portion 41 thereof and parallel to each other, and a second pattern 45, such as one or more horizontal lines 45 formed in the lower portion 42 thereof and parallel to each other.

In operation, as shown in FIGS. 7–9, when the recess 33 of the plate 30 and the lens 40 are moved to align with the laser instrument 21, particularly when the vertical lines 44 or the upper portion 41 of the lens 40 are moved to be aligned with the laser instrument 21 (FIG. 7), the laser instrument 21 may generate and emit light through the upper portion 41 of the lens 40 to generate a vertical light beam 71.

As shown in FIG. 8, when the horizontal lines 45 or the lower portion 42 of the lens 40 are moved to be aligned with the laser instrument 21, the laser instrument 21 may generate and emit light through the lower portion 42 of the lens 40 to generate a horizontal light beam 70. As shown in FIG. 9, when the intermediate portion 43 of the lens 40 is moved to be aligned with the laser instrument 21, the laser instrument 21 may generate and emit light through the intermediate portion 43 of the lens 40 to generate a cross-shaped light beam 70, 71.

It is to be noted that the second actuator 37 of the plate 30 may be arranged to engage with and to depress the other knob 24 of the switch 22, and thus to control or to actuate or to energize the laser instrument 21 when the recess 33 of the plate 30 and either of the upper and the lower and the intermediate portions 41–43 of the lens 40 is aligned with the laser instrument 21, to allow the laser instrument 21 to be energized to generate and emit light through the lens 40, and thus to generate the light beams 70, 71.

Figures 2, 3:
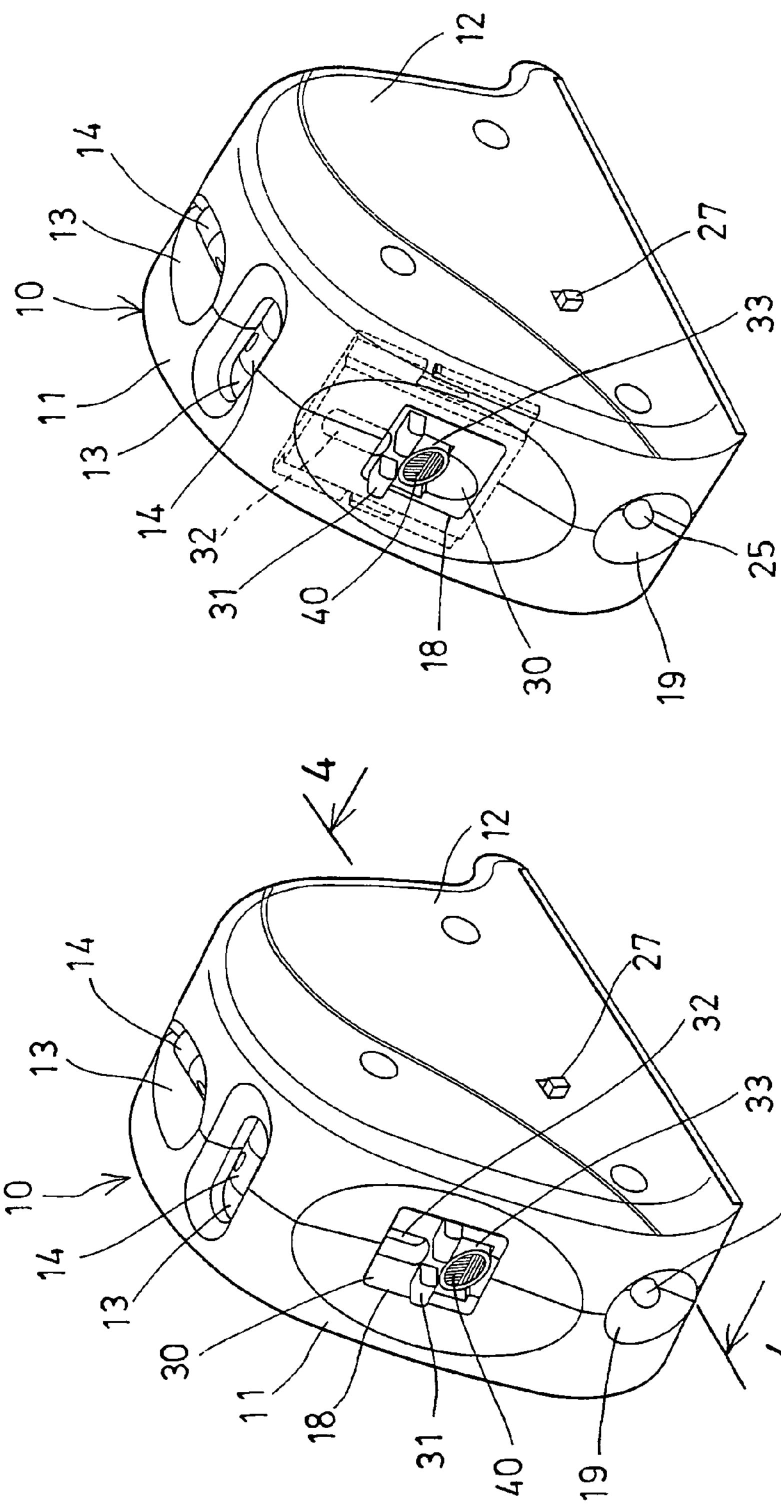
FIG. 2 is a front perspective view of the laser leveling device.
FIG. 3 is a front perspective view similar to FIG. 2, illustrating the operation of the laser leveling device.

Accordingly, when the plate 30 is moved relative to the housing 10, to align the aperture 32 thereof with the laser instrument 21 (FIG. 4), a point or dot shape light beam may be generated by the laser instrument 21 and directly emitted through the aperture 32 of the plate 30. No light beam will be generated by the laser instrument 21, and the laser instrument 21 will not be energized to generate light when neither the aperture 32 of the plate 30 nor the recess 33 of the plate 30 and the lens 40 are aligned with the laser instrument 21 (FIG. 2).

When the plate 30 is further moved relative to the housing 10, to align the recess 33 thereof with the laser instrument 21 (FIGS. 7–9) and when either of the upper and the lower and the intermediate portions 41–43 of the lens 40 is aligned with the laser instrument 21, either a horizontal light beam 70, a vertical light beam 71, or a cross-shaped light beam 70, 71 may be generated by the laser instrument 21 through either of the upper and the lower and the intermediate portions 41–43 of the lens 40.

Accordingly, the laser leveling device in accordance with the present invention may be used to switch to or to select different light beams.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A laser leveling device comprising:

a housing, a laser instrument disposed in said housing for generating light, a switch disposed in said housing, a plate slidably received in said housing and movable relative to said housing including an aperture formed therein and movable to be selectively aligned with said laser instrument when said plate is moved relative to said housing to allow the light generated by said laser instrument to selectively emit through said aperture of said plate, and a lens attached to said plate, said lens including a first portion having a first pattern provided therein, said first pattern including at least one vertical line formed in said first portion of said lens to generate a first light beam when said laser instrument generates the light through said first portion of said lens, and including a second portion having a second pattern provided therein, said second pattern including at least one horizontal line formed in said second portion of said lens to generate a second light beam when said laser instrument generates the light through said second portion of said lens, said lens including an intermediate portion located between said first portion and said second portion of said lens, said plate being movable relative to said housing to selectively align either of said first portion or said second portion of said lens with said laser instrument, to allow the light beam generated by said laser instrument to selectively emit through either of said first portion or said second portion of said lens, said plate including a first actuator extended therefrom to selectively engage with said switch and to selectively actuate said laser instrument when said lens of said plate is aligned with said laser instrument, and including a second actuator extended therefrom to selectively engage with said switch and to selectively actuate said laser instrument when said aperture of said plate is aligned with said laser instrument.

2. The laser leveling device as claimed in claim 1, wherein said switch includes a knob provided thereon for being actuated by said second actuator of said plate.

3. The laser leveling device as claimed in claim 1, wherein said plate includes a hand grip provided thereon for moving said plate relative to said housing.

4. The laser leveling device as claimed in claim 1 further comprising means for energizing said laser instrument.

5. The laser leveling device as claimed in claim 1, wherein said housing includes a magnetic member disposed therein for attracting and securing said housing onto a supporting member.

6. The laser leveling device as claimed in claim 1, wherein said housing includes a rotary member having a nail extended therefrom and selectively extendible out of said housing for engaging into a supporting member.

7. The laser leveling device as claimed in claim 1, wherein said housing includes at least one bubble leveling vial attached thereon.

* * * * *